United States Patent [19]

Ketcham

[11] Patent Number: 5,047,373

[45] Date of Patent: * Sep. 10, 1991

[54] CERAMIC MATERIALS EXHIBITING PSEUDO-PLASTICITY AT ROOM TEMPERATURE

[75] Inventor: Thomas D. Ketcham, Big Flats, N.Y.

[73] Assignee: Corning Incorporated, Corning, N.Y.

[*] Notice: The portion of the term of this patent subsequent to Jul. 3, 2007 has been disclaimed.

[21] Appl. No.: 328,532

[22] Filed: Mar. 24, 1989

[51] Int. Cl.$^5$ .............................................. C04B 35/48
[52] U.S. Cl. .................................. 501/103; 501/104; 501/105
[58] Field of Search ...................... 35/48; 501/103, 104, 501/105, 51, 73

[56] References Cited

U.S. PATENT DOCUMENTS

| | | | |
|---|---|---|---|
| Re. 32,449 | 6/1987 | Claussen et al. | 501/103 |
| 4,314,909 | 2/1982 | Beall et al. | 501/73 |
| 4,360,598 | 11/1982 | Otagiri et al. | 501/103 |
| 4,457,727 | 8/1988 | Claussen et al. | 501/105 |
| 4,552,852 | 11/1985 | Manning | 501/105 |
| 4,626,517 | 12/1986 | Wanatabe et al. | 501/103 |
| 4,640,902 | 2/1987 | Lange | 501/105 |
| 4,659,680 | 4/1987 | Guile | 501/104 |
| 4,666,467 | 5/1987 | Matsumoto et al. | 501/105 |
| 4,690,910 | 9/1987 | Tsukuma et al. | 501/103 |
| 4,690,911 | 9/1987 | Nakada | 501/103 |
| 4,767,730 | 8/1988 | Soma et al. | 501/103 |
| 4,770,673 | 9/1988 | Ketcham et al. | 501/105 |
| 4,774,209 | 9/1988 | Gadharee et al. | 501/105 |
| 4,804,645 | 2/1989 | Elkstrom | 501/105 |

FOREIGN PATENT DOCUMENTS 0294844 12/1988 European Pat. Off. .............. 35/480

OTHER PUBLICATIONS

"In Elastic Deformation of Mg-PSZ and its Significance for Strength Toughness Relationship of Zirconia Toughened Ceramics" MV Swain Acta Metall 33 No. 11 pp. 2083-2091 (1985).

"Strength Limitations of Transformation Toughened Zirconia Alloys" Journal of the American Ceramic Society, 69 No. 7 pp. 511-518 (Jul. 1986), Swain et al.

K. Tsukuma and M. Shimada "Strength, Fracture Toughness and Vickers Hardness of $CeO_2$-Stabilized Tetragonal $ZrO_2$ Polycrystals(C-TZP)" Journal of Mat'ls Sci 20 1178-1184 (1985).

P. E. Reyes-Morel et al. "Transformation Plasticity of $CeO_2$ Stabilized Tetragonal Polycrystals: II Pseudoelasticity and Shape Memory Element" Journal of the American Cermaic Society 76 pp. 648-657, (1988).

Glass Ceramics and Photositalls, Berezhnoi, Plenum Press New York (1970), pp. 195-197.

Primary Examiner—William R. Dixon, Jr.
Assistant Examiner—Paul Marcantoni
Attorney, Agent, or Firm—C. S. Janes, Jr.

[57] ABSTRACT

Two composition areas of partially stabilized $ZrO_2$/$HfO_2$ alloys have been discovered which exhibit pseudo-plasticity through the presence of transformation bands and with the substantial absence of microcracking. The first area consists essentially, in mole percent, of 0.5-8% of at least one toughening agent in the indicated proportion selected from the group consisting of 0-8% $YNbO_4$, 0-8% $YTaO_4$, 0-8% $RENbO_4$, 0-8% $RETaO_4$, 0-8% $YVO_4$, 0-8% $REVO_4$, 0-8% $MgWO_4$, 0-8% $MgMoO_4$, 0-8% $CaWO_4$, 0-8& $CaMoO_4$, and 0-8% $SnO_2$, and 0.5-10% of at least one stabilizer oxide in the indicates proportion selected from the group consisting of 0-3.5% $Y_2O_3$, 0-3.5% $Sc_2O_3$, 0-3.5% $RE_2O_3$, 0-10% $CeO_2$, 0-10% $TiO_2$, 0-10% $SnO_2$, 0-10% $CaO$, and 0-10% $MgO$, with the remainder $ZrO_2/HfO_2$ alloy. The second area consists essentially, in mole percent, of 8-16% $CeO_2$ and 0.25-5% $Nb_2O_5$ and/or $Ta_2O_5$, and/or $V_2O_5$, wherein up to one-half of the $CeO_2$ can be replaced with $Y_2O_3$ and/or $RE_2O_3$, with the remainder $ZrO_2/HfO_2$ alloy.

35 Claims, No Drawings

CERAMIC MATERIALS EXHIBITING PSEUDO-PLASTICITY AT ROOM TEMPERATURE

BACKGROUND OF THE INVENTION

Ceramic materials that deform plastically at room temperature to demonstrate a measure of ductility have long been sought. The scientific literature has described some heavily microcracked bodies purported to be highly compliant. The mechanical strengths exhibited by those bodies have generally been quite low, however, as would be expected. Studies of fiber reinforced glasses and glass-ceramics have also shown promise, but they again, in some sense, rely upon microcracking of the matrix and the fiber-matrix interface to obtain their good fracture properties.

Recently, the following two types of zirconia-based ceramic materials have been discussed in the literature as demonstrating limited pseudo-plastic deformation:

The first type is based upon observations of non-linear stress-strain behavior in certain transformation toughened, partially-stabilized $ZrO_2$ bodies. To illustrate:

M. V. Swain in "Inelastic Deformation of Mg-PSZ and Its Significance for Strength-Toughness Relationship of Zirconia Toughened Ceramics," *Acta Metall.*, 33, No. 11, pages 2083-2091, 1985, described non-linear stress-strain behavior in large grain size (50-100 micron) magnesia partially-stabilized $ZrO_2$.

M V. Swain and L. R. F. Rose in "Strength Limitations of Transformation-Toughened Zirconia Alloys," *Journal of the American Ceramic Society*, 69, No. 7, pages 511-518, July 1986, described magnesia partially-stabilized zirconia exhibiting a significant amount of pseudo-plasticity, apparently derived from microcracking and phase transformation of zirconia associated with that microcracking. The mechanical strength demonstrated by those materials was no more than about 100 Kpsi.

K. Tsukuma and M. Shimada in "Strength, Fracture Toughness and Vickers Hardness of $CeO_2$-Stabilized Tetragonal $ZrO_2$ Polycrystals (Ce-TZP)," *Journal of Materials Science*, 20, 1178-1184 (1985) disclosed $CeO_2$-stabilized zirconia bodies manifesting some pseudo-plasticity, again as a result of microcracking and attendant phase transformation of $ZrO_2$. Nevertheless, the contribution of each to the development of pseudo-plasticity, i.e., the microcracking and the phase transformation, was not defined. In any event, the $CeO_2$-containing bodies exhibiting pseudo-plasticity demonstrated mechanical strengths less than 75 Kpsi.

P. E. Reyes-Morell, J. Cherng, and I-Wei Chen in "Transformation Plasticity of $CeO_2$-Stabilized Tetragonal Polycrystals: II, Pseudoelasticity and Shape Memory Effect," *Journal of the American Ceramic Society*, 71, (8), pages 648-657, 1988, described stress-strain behavior of 12 mole percent $CeO_2$-TZP under uniaxial compression and hydraulic compression and shape recovery by heating. They also provided a rather detailed theoretical analysis of the mechanism underlying such deformation.

The second type of zirconia-based materials exhibiting pseudo-plastic deformation has involved a low temperature, water reaction mechanism. To illustrate:

U.S. Pat. No. 4,767,730 disclosed $ZrO_2$-containing articles which plastically deformed through a phase transformation taking place between the tetragonal and monoclinic phases of $ZrO_2$ by maintaining the articles at a given temperature and imposing a given stress thereon. The original configuration of the articles can be restored by again holding the articles at a given temperature greater than that used to deform the article and applying a specified stress thereupon. The patent termed that phenomenon "shape memory," thereby correlating the effect with that observed in certain metal alloys.

The patent attributed the mechanism underlying the phenomenon as constituting a martensite transformation from tetragonal $ZrO_2$ in a metastable state to monoclinic $ZrO_2$. Inasmuch as the phase transformation between the tetragonal phase and the monoclinic phase is induced by an applied stress when an appropriate stress is imposed thereon, the article is plastically deformed after normal elastic deformation without being broken. The patent also observed that the desired activating phase transformation is accelerated when the stress is applied in a water-containing environment, and that the rate of acceleration can be increased by raising the water content in the atmosphere. A review of the patent seems to indicate that practical rates of plastic deformation were achieved only at temperatures of about 200°-300° C. in the presence of water vapor.

The working examples provided in the patent utilized bodies consisting of a $ZrO_2$-$Y_2O_3$ solid solution (94.6% $ZrO_2$-5.4% $Y_2O_3$ by weight), which bodies were subjected to a stress of about 50-3000 MPa at a temperature of about 0°-400° C. to effect the plastic deformation.

Visual microscopic examination and electron microscope studies of the articles resulting from the disclosure of that patent have indicated the presence of significant microcracking due to a reaction taking place with water vapor. In essence then, the pseudo-plasticity demonstrated by the articles of the patent is founded upon the same mechanism as that underlying the two types of products described in the scientific literature which were discussed above, such that the articles of the patent are subject to the same problems and drawbacks.

I. Nettleship and R. Stevens in "Tetragonal Zirconia Polycrystal (TZP)-A Review," *International Journal of High Technology Ceramics*, 3, pages 1-32, 1987, provide an extensive discussion of the low temperature (150°-350° C.) water vapor aging or corrosion phenomenon, such as is disclosed in U.S. Pat. No. 4,767,730 above, as well as a review of the pseudo-plasticity evidenced by $CeO_2$-stabilized TZP. The authors focus on the water vapor aging as a detrimental phenomenon and also state that, despite the high toughness values displayed by the $CeO_2$-stabilized TZP materials, the mechanical strengths exhibited by them are so low that they "will require improvement before Ce-TZP presents a serious challenge to Y-TZP."

Therefore, the primary objective of the present invention was to produce partially-stabilized $ZrO_2/HfO_2$ ceramic articles demonstrating pseudo-plasticity, but wherein the mechanism effecting that phenomenon does not involve the occurrence of substantial microcracking, whether occurring during transformation of the tetragonal phase to the monoclinic phase or as a result of water vapor aging, such that the articles exhibit high mechanical strength.

Another objective of the present invention was to produce such ceramic articles exhibiting pseudo-plasticity coupled with high toughness.

SUMMARY OF THE INVENTION

Those objectives can be achieved in ceramic alloys consisting essentially of specifically-defined concentrations of partially-stabilized $ZrO_2$ and/or $HfO_2$ and transformation toughening agents therefor.

U.S. patent application Ser. No. 926,655, filed Nov. 4, 1986 under the title TOUGHENED ZIRCONIA ALLOYS, (European Patent Application 199,459, published Oct. 29, 1986) provides an extensive discussion of the mechanism underlying transformation toughening of $ZrO_2$ and/or $HfO_2$-containing ceramic alloys. Hence, as is explained therein, transformation toughening results from the volume change which accompanies the transformation from the tetragonal state to the monoclinic state. That transformation can be controlled through the incorporation of a stabilizing oxide; i.e., the addition of a sufficient amount of a stabilizing oxide can result in the retention of the tetragonal phase from high temperatures down to room temperature.

European Patent Application 199,459 is particularly directed to alloys wherein the mechanism of production comprised the transformation toughening of partially-stabilized $ZrO_2$ and/or $HfO_2$ through the incorporation of 0.5–8 mole percent of niobate and/or tantalate compounds, preferably yttrium and/or rare earth metal niobate and/or tantalate compounds. U.S. Pat. No. 4,753,902 provides another disclosure of transformation toughened ceramic alloys wherein the alloys consist essentially of $ZrO_2$ and $TiO_2$, the $ZrO_2$ being partially stabilized with $Y_2O_3$ and/or a rare earth metal oxide. U.S. patent application Ser. No. 245,523, filed Sept. 19, 1988 under the title TRANSFORMATION TOUGHENED CERAMIC ALLOYS, is drawn to yet another group of transformation toughened ceramic alloys, with particular emphasis on alloys consisting essentially of partially-stabilized $ZrO_2$ and/or $HfO_2$ with a toughening agent selected from the group consisting of a rare earth metal vanadate, a magnesium and/or calcium tungstate and/or molybdate, and $SnO_2$. Finally, U.K. Patent Application GB 2,206,111A describes transformation toughened ceramic alloys consisting essentially, in mole percent of 76–92% $ZrO_2$, 8–20% $CeO_2$, and 0.1–4% $La_2O_3$ and/or $Pr_2O_3$.

I have discovered two composition regions of $ZrO_2$ and/or $HfO_2$ alloys, wherein the $ZrO_2$ and/or $HfO_2$ is primarily present in the tetragonal phase, which can exhibit substantial plastic strain, viz., greater than 50% of pure elastic strain in addition to the elastic strain, when subjected to four point bending at room temperature before fracture. The first composition region consists essentially of $ZrO_2$ and/or $HfO_2$ toughened with at least one compound selected from the group consisting of a yttrium and/or rare earth niobate and/or tantalate and/or vanadate, a calcium and/or magnesium tungstate and/or molybdate, $SnO_2$, and mixtures thereof, and partially stabilized with at least one compound selected from the group consisting of $Y_2O_3$, $CeO_2$, $Sc_2O_3$, $RE_2O_3$, $TiO_2$, $SnO_2$, $CaO$, $MgO$, and mixtures thereof. ($RE_2O_3$ designates rare earth oxides selected from the group consisting of $La_2O_3$, $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, and $Lu_2O_3$.) The second composition region consists essentially of $ZrO_2$ and/or $HfO_2$ toughened with $Nb_2O_5$ and/or $Ta_2O_5$ and/or $V_2O_5$ and partially stabilized with $CeO_2$, wherein $Y_2O_3$ and/or $Sc_2O_3$ and/or a rare earth oxide may replace up to one-half of the $CeO_2$.

In general, the first composition region will consist essentially, expressed in terms of mole percent on the oxide basis, of:
(A) 82–99% of at least one member selected from the group consisting of $ZrO_2$, $HfO_2$, and $ZrO_2$-$HfO_2$ solid solution;
(B) 0.5–10% of at least one stabilizer oxide in the indicated proportion selected from the group consisting of 0–3.5% $Y_2O_3$, 0–3.5% $Sc_2O_3$, 0–3.5% $RE_2O_3$, 0–10% $CeO_2$, 0–10% $TiO_2$, 0–10% $SnO_2$, 0–10% $CaO$, and 0–10% $MgO$; and
(C) 0.5–8% of at least one toughening agent in the indicated proportion selected from the group consisting of 0–8% $YNbO_4$, 0–8% $YTaO_4$, 0–8% $YVO_4$, 0–8% $RENbO_4$, 0–8% $RETaO_4$, 0–8% $REVO_4$, 0–8% $MgWO_4$, 0–8% $MgMoO_4$, 0–8% $CaWO_4$, 0–8% $CaMoO_4$, and 0–8% $SnO_2$.

In the preferred compositions the toughening agent will be present in amounts up to 5% and $Y_2O_3$ and/or $Sc_2O_3$ and/or $RE_2O_3$ in amounts up to 2.5% will constitute the stabilizer oxide.

In general, the second composition region will consist essentially, expressed in terms of mole percent on the oxide basis, of:
(A) 79–91.75% of at least one member selected from the group consisting of $ZrO_2$, $HfO_2$, and $ZrO_2$-$HfO_2$ solid solution;
(B) 8–16% $CeO_2$; and
(C) 0.25–5% $Nb_2O_5$ and/or $Ta_2O_5$ and/or $V_2O_5$; wherein up to one-half of the $CeO_2$ may be replaced with $Y_2O_3$ and/or $RE_2O_3$.

The preferred compositions contain 8–14% $CeO_2$ and 0.25–2.5% $Nb_2O_5$ and/or $Ta_2O_5$ and/or $V_2O_5$ wherein up to one-half of the $CeO_2$ may be replaced with $Y_2O_3$ and/or $RE_2O_3$.

In each composition region the plastic strain demonstrated by the products is derived from, and is evidenced by, transformation bands of monoclinic $ZrO_2$ and/or $HfO_2$ containing a toughening agent and a dopant which form adjacent to the surface of the side of the article placed in tension. Hence, in the case of a test bar, the transformation bands are developed adjacent to the surface of the bar between the loading points of the applied stress. The "yield" stress, i.e., the transformation stress, can be modified through changes in bulk composition (including whether prepared under oxidizing or reducing conditions) and sintering conditions; the latter leading to differences in grain sizes, phase assemblage, and exact composition of the individual phases in the final fired product. Thus, where the application of stress is stopped prior to fracture of a body, but after the "yield" transformation stress has been exceeded, a permanent strain is produced in the body. Such metal-like ductility in a ceramic body can be useful in the development of tough, hard, corrosion resistant, wear and abrasion resistant materials for science, industry, and consumer applications.

I have observed that the surfaces of non-ductile compositions can be made ductile through diffusion and reaction processes. For example, when a non-ductile body such as $ZrO_2 + 3$ mole % $Y_2O_3$ or even a cubic single crystal of $ZrO_2$ stabilized with $Y_2O_3$ is placed in a bed of $Nb_2O_5$ at a temperature of about 1400° C., the $Nb_2O_5$ will rapidly diffuse into the non-ductile composition producing a body with a toughening agent ($YNbO_4$) therein. It is posited that this type of modification will take place with each of the above-mentioned toughening agent compounds, and that even just the oxides of 4+, 5+, and 6+ cations in the toughening agents can also diffuse into the surface of a given stabilized or partially-stabilized $ZrO_2$ and/or $HfO_2$ composition to yield a toughening agent in situ.

The inventive compositions have also exhibited shape memory behavior. To illustrate, test bars bent under stress at room temperature became straight when heated between about 150°–700° C. and remained straight upon cooling to room temperature. A test bar of a particular composition demonstrated a "two-way" shape memory effect; viz., a bend in a bar at room temperature straightened out when heated between 150°–700° C., but the bend returned when the bar was cooled back to room temperature. Such shape memory behaviors commend their utility in a number of applications, e.g., connector components for optical waveguides. Those compositions demonstrating the greatest ductility also appear to be the preferred compositions with respect to exhibiting a shape memory effect.

Additions of modest volume fractions of hard refractory ceramics can be tolerated and may actually be beneficial in securing ductile behavior. Such secondary phases can include $Al_2O_3$, $Al_2O_3$-$Cr_2O_3$ solid solutions, $Cr_2O_3$, mullite, silicon carbide, silicon nitride, spinel, titanium carbide, titanium diboride, titanium nitride, zircon, and zirconium carbide. The volume fraction of a secondary phase must be kept below a level that would prevent the formation of the transformation bands. Hence, the ductile alloy will most preferably be continuous on a microscopic and macroscopic scale in the composite body. Such requirement dictates that the content of a hard refractory ceramic will not exceed about 50% by volume of the composite body. In general, at least 5% will be added to impart a substantive effect.

Additions of refractory ceramic fibers and/or whiskers can also be tolerated, but in a smaller volume fraction than hard refractory ceramics. Thus, up to about 30% by volume of the composite body can include such fibers and/or whiskers as $Al_2O_3$, mullite, sialon, silicon carbide, silicon nitride, AlN, BN, $B_4C$, $ZrO_2$, zircon, silicon oxycarbide, and spinel. In like manner to the hard refractory ceramic, at least 5% fibers and/or whiskers will be entrained.

Mixtures of hard refractory ceramics and refractory ceramic fibers and/or whiskers are also possible. For example, composite articles can be produced consisting essentially of at least 50% by volume of the inventive alloy, at least 5%, but less than 30%, by volume of refractory fibers and/or whiskers, and the remainder hard refractory ceramics.

Although the ductile alloy will most preferably be continuous in any composite body, thin second phases such as grain boundary glassy films can transfer enough stress across the grain boundary to help nucleate the monoclinic phase in an adjacent grain, thereby assisting the autocatalytic process which is believed to occur during formation of the transformation bands. Various refractory glass compositions, such as $Y_2O_3$, $Sc_2O_3$, and/or rare earth metal oxide aluminosilicate glasses, can be utilized as a continuous second phase and will aid the sintering of the inventive ductile alloys. (As employed here, "rare earth metal oxide" includes cerium oxide.) Those glasses can also enlarge the range of operable compositions (by reducing the concentration of stabilizer required) of the $ZrO_2$/$HfO_2$-based tetragonal solid solutions that can exhibit ductile behavior. The glasses accomplish this by modifying the stresses at the grain boundary; such modification arising, for example, by changing the coefficient of thermal expansion of the glass, by changing the elastic modulus of the glass, by changing the thickness of the glass along the grain boundary, by changing the shape of the alloy grains (rounded as opposed to angular), and/or by changing the temperature at which the stress caused by the anisotropic coefficients of thermal expansion of the $ZrO_2$/$HfO_2$-based tetragonal solid solution are relaxed through viscous flow of the glass.

Changing the stresses at the grain boundary alters the probability of nucleation of the monoclinic phase from the tetragonal phase in individual grains. That factor alters the average external stress required for the nucleation of the monoclinic phase and, it is theorized, can change the auto-catalytic conditions that produce the transformation bands which, in turn, impart ductile behavior to the alloy.

In general, the amount of such glasses ought to be held below that which will prevent the formation of transformation bands for a given combination of glass compositions and tetragonal solid solutions of $ZrO_2$ and/or $HfO_2$-containing materials. Inasmuch as some glass compositions will form a continuous second phase along the grain boundary of the alloy particles and thereby tend to isolate each grain, the glass content should be kept below about 50% by volume and preferably below about 30%. The glass compositions must be so chosen to avoid leaching out the elements of the stabilizers and toughening agents from the alloy. Hence, the glass compositions may desirably contain substantial amounts of stabilizers and toughening agents to thereby approach chemical equilibrium between the alloy and the glass composition.

It is postulated that the ductility observed results at least in part from the volume expansion of the tetragonal-to-monoclinic transformation which generates the transformation bands on the tensile side of the bend bars. Under some circumstances a large tensile stress as well as a bending stress may be present. In those situations a transformation band may propagate across the majority of the load bearing area of an article made from the inventive materials. Such an article might fail while displaying little ductility.

To avoid that phenomenon, rods, sheets, or fibers of high strength materials can be entrained within the inventive alloys to obtain a ductile response in tensile loading. The high strength material must impart tensile strength to the body while concurrently permitting the transformation bands to propagate. In addition, the high strength material must be chemically compatible with the inventive alloy; it must be able to withstand the high temperatures required in sintering the alloy to a dense body; its coefficient of thermal expansion must be compatible with that of the alloy; and the form and volume fraction of the high strength material must be such as to allow the transformation zones in the alloy to grow.

Rods, fibers, or sheets of a high strength, but non-ductile, $ZrO_2$ alloy, such as $ZrO_2$ stabilized with 2-3 mole percent $Y_2O_3$ with or without $Al_2O_3$, will comprise excellent high strength materials, especially in view of the fact that the compositions of the ductile and non-ductile alloys can be so adjusted that the two components can be co-sintered. To illustrate, sheets of ductile alloy having a thickness of about 10 microns or somewhat higher, in combination with sheets of high strength, non-ductile $ZrO_2$ alloy of about the same dimensions, can be formed into a composite through tape casting and lamination, co-extrusion, or other methods known to the art. Where rods or fibers of the high strength material are preferred over sheets, such composites can be prepared through co-extrusion or other methods known to the art.

The lower limit on the dimensions of the rods, fibers, or sheets will be governed in some instances by the need for preventing complete interdiffusion of the ductile and non-ductile compositions. The ductile regions also need to be large enough and continuous enough so that transformation bands/zones can form readily. Such regions may be as small as a few grains' diameter in dimensions.

The inventive alloys readily lend themselves to such conventional forming means as hot pressing, hot isostatic pressing, and pressureless sintering. The materials can be sintered at temperatures below about 1700° C., with temperatures between about 1000°–1600° C. normally being employed.

DESCRIPTION OF PREFERRED EMBODIMENTS

European Patent Application 199,459 describes two methods for making finely-divided, sinterable powders of desired compositions for use in producing transformation toughened $ZrO_2$ and/or $HfO_2$ alloys. The first method involved a coprecipitation technique, whereas the second used commercially-available $ZrO_2$ and/or $HfO_2$ powders with a stabilizer additive to which various additions were made. Powders of the working examples reported in Tables I, II, III, and IV below, except those containing $CaWO_4$ and $TiO_2$, were produced utilizing either the coprecipitation technique or the addition method described in European Application 199,459.

Thus, some compositions were prepared through additions of $Nb_2O_5$, $Ta_2O_5$, $Ce(NO_3)_4$, $La(NO_3)_3$, $Nd(NO_3)_3$, $Gd(NO_3)_3$, $Y(NO_3)_3$, and $Yb(NO_3)_3$ to commercially-available $ZrO_2$ powders with $Y_2O_3$, $CeO_2$, or no stabilizer additive, and in one instance a commercially-available $ZrO_2$ powder with $Y_2O_3$ and $Al_2O_3$ additives. Where the nitrates were used, the components were mixed together in a methanol slurry, dried, and calcined at about 800° C. before the addition of, for example, $Nb_2O_5$ or $Ta_2O_5$.

In some instances, $Nb_2O_5$ was added by precipitation of $Nb(OH)_5$ around the commercially-available $ZrO_2$ powder by reacting $NH_4OH$ with a solution of $NbCl_5$ dissolved in methanol. In two examples the entire powder was coprecipitated from an aqueous solution.

The examples recorded in Tables II and III containing $CaWO_4$ or $TiO_2$ and $Y_2O_3$ were prepared in the following manner. Appropriate amounts of $CaCO_3 + WO_3$ or $TiO_2$ were ballmilled with a commercially-available $ZrO_2$ powder containing 2 or 4 mole % $Y_2O_3$ as a stabilizing oxide in a polypropylene container using $ZrO_2$ balls as the milling media. Isopropyl alcohol was added to cover the powder and the milling media and the containers placed into vibromilling canisters and milled for about 24–60 hours. The resulting slurry was poured into PYREX ® drying dishes and air dried in an oven operating at 320° F. (160° C.). After drying, the powder was poured into $Al_2O_3$ crucibles, the crucibles partially covered, and the powder calcined in air for two hours at 800° C. for the $CaWO_4$-containing powder and 700° C. for the $TiO_2$-containing powder.

In those examples reported in Tables II and III containing $TiO_2$ with no $Y_2O_3$, the following procedure was employed. $ZrO_2$ and $TiO_2$ powders were mixed and calcined as above. Then nitrates of the cited rare earth stabilizer oxides in appropriate amounts were dissolved in methyl alcohol. The $ZrO_2$-$TiO_2$ powders in the proper amounts were admixed into the solution to form a slurry. The slurry was then air dried and the residual powder calcined at 700° C. for two hours in like manner to the above-described procedure.

In each method the calcined powders were vibromilled for 24 hours and scalped through a nylon screen to break up any agglomerates, reducing the size of any agglomerates to 50 microns and less. The resulting material was pressed into discs using a die having a diameter of 0.5" ($\approx 13$ mm), first uniaxially at ambient temperature and 1000 psi, and then isostatically for 10 minutes at ambient temperature and 45 Kpsi. Thereafter, the discs were sintered in air for two hours at temperatures between 1300°–1600° C.

To observe the bending behavior of the various compositions, powders were uniaxially pressed into bar shapes having the dimensions of about $3" \times 0.5$–$1" \times 0.5"$ ($\approx 8 \times 1.3$–$2.5 \times 1.3$ cm); those bars were isostatically pressed at ambient temperature at about 30–45 Kpsi; the bars were thereafter sintered in air to essentially closed porosity at temperatures between about 1300°–1600° C. and for times of about 2–3 hours; and those sintered bars were then hot isostatically pressed for two hours at 1400° C. and a pressure of 20 Kpsi using carbon heating elements. Hot isostatic pressing at 1300° C. at a pressure of 20 Kpsi using molybdenum heating elements in an argon atmosphere was employed when the examples contained $CeO_2$ or when the bars were sintered at temperatures below 1400° C. All $CeO_2$-containing bars that were hot isostatic pressed at 1400° C. using carbon heating elements microcracked upon cooling. Utilizing molybdenum heating elements and isostatically pressing at 1300° C. inhibited microcracking in a number of the $CeO_2$-containing compositions. It is believed that the "destabilizing" reduction of the $CeO_2$ stabilizer with consequent microcracking during cooling of the bar is decreased by employing a lower temperature and using molybdenum heating elements.

In an alternative method the powders were fashioned into discs by simply uniaxially hot pressing for one hour in graphite dies at about 1500°–1550° C. at a pressure of 6 Kpsi.

The control samples were formed into bend bars utilizing commercially-available $ZrO_2$-containing powders which were uniaxially pressed into bar shapes; the bars isostatically pressed at ambient temperature at about 30–45 Kpsi; the bars then sintered at 1400° C., 1450° C., 1500° C., 1540° C., or 1600° C.; and the bars subsequently hot isostatically pressed in the same manner and for the same time as described above.

Discs having a diameter of about 10 mm and thicknesses of about 3–5 mm were prepared from a variety of compositions employing uniaxial pressing, followed by isostatically pressing at ambient temperature and then sintering in air or in a vacuum, with some sintered discs being subjected to the hot isostatic pressing technique described above.

For the stress-stain tests reported in Table I, bars having dimensions of about $54 \times 5 \times 1$ mm were made from hot isostatically pressed billets having dimensions of about $54 \times 8 \times 8$ mm. The bars were sawn from the billets and then ground and polished to a 3 or 6 micron size diamond paste finish with rounded edges except for one bar of Example 2 (reported as 2*) which was simply subjected to a 320 grit SiC grinding wheel.

The bars were tested in four point bending with an outer span of two inches ($\approx 51$ mm) and an inner span of 0.75" ($\approx 19$ mm) using a universal testing machine. The downward movement of the crosshead was either 0.75 mm/minute or 0.2 mm/minute. The deflection of the midpoint on the tensile side of the bar was monitored by a deflectometer. Stress-strain curves were derived from load deflection curves. The designated stress is the outer fiber stress; elastic behavior and an elastic modulus of 200 GPa for all compositions being assumed.

The fracture stress, $\sigma_f$, was determined from the maximum load and the standard elastic beam bending formula. A straight line was drawn through the linear portion of the stress-deflection curve. The stress at which the curve deviated from linearity is defined as the yield stress, $\sigma_y$. The elastic strain, $\epsilon_e$, was determined by dividing the tensile stress at which the bar fractured by the elastic modulus. The actual deflection where the bar fractured divided by the deflection at which the straight line crossed the fracture stress is defined as being proportional to the elastic strain plus the plastic strain, $\epsilon_p$, divided by the elastic strain.

The above procedure is acknowledged to be not absolutely accurate inasmuch as the transformation bands on the tensile side of the bar modify the stresses and strains and quite likely shift the neutral axis. Nevertheless, it is believed to yield a close approximation.

The samples tested in Table II comprised either bars from the stress-strain test or smaller discs having a diameter of about 1 cm and a thickness of about 3-4 mm. The surfaces of the bars or discs were polished to a 1 or 6 micron diamond paste finish prior to testing. Each sample was subjected to a 10 Kg load in a Vickers microhardness testing machine. Photomicrographs of the indentations were taken with oblique lighting that highlighted the transformation zone around the indent impression. The diameter of the transformation zone was measured from the photomicrographs.

Table I records a number of exemplary compositions which demonstrate ductile, i.e., non-linear, behavior at room temperature. Table I also lists the yield stress as well as the amount of plastic strain. Transformation bands were observed on the tensile side of the bend bars (excluding the control samples), customarily located underneath the inner loading points and often extending between the inner loading points. Because these transformation bands constitute the macroscopic mechanism of the perceived ductility, they comprise a second source of evidence of ductility in addition to the stress-strain behavior. Such bands were not observed on the compressive side of the bars.

In Table I, S.T. designates the sintering temperature in °C. at which the powder samples were subjected and H.T. the temperature in °C. at which the sintered bodies were hot isostatically pressed. $\sigma_f$ represents the fracture stress in Kpsi; $\sigma_y$ represents the yield stress in terms of Kpsi; $\sigma_y/\sigma_f$ indicates the ratio of yield stress to fracture stress in terms of percent; $\epsilon_p$ designates the plastic strain in terms of percent; and $\epsilon_p/\epsilon_e$ represents the ratio of plastic strain to elastic strain in terms of percent. Finally, m % reflects mole percent and wt % indicates weight percent.

TABLE I

| Example | Composition | S.T. | H.T. | $\sigma_f$ | $\sigma_y$ | $\sigma_y/\sigma_f$ | $\epsilon_p$ | $\epsilon_p/\epsilon_e$ |
| --- | --- | --- | --- | --- | --- | --- | --- | --- |
| 1 | $ZrO_2$ + 2 m % $Y_2O_3$ | 1540 | 1400 | 167 | — | — | — | — |
| 1 | $ZrO_2$ + 2 m % $Y_2O_3$ | 1500 | 1400 | 170 | — | — | — | — |
| 1 | $ZrO_2$ + 2 m % $Y_2O_3$ | 1450 | 1400 | 153 | — | — | — | — |
| 2 | $ZrO_2$ + 2 m % $YNbO_4$ + 2 m % $Y_2O_3$ | 1500 | 1400 | 159 | 88 | 55 | 0.17 | 31 |
| 2 | $ZrO_2$ + m % $YNbO_4$ + m % $Y_2O_3$ | 1450 | 1400 | 142 | 118 | 83 | 0.014 | 3 |
| 2* | $ZrO_2$ + m % $YNbO_4$ + m % $Y_2O_3$ | 1450 | 1400 | 148 | 125 | 84 | 0.023 | 5 |
| 3 | $ZrO_2$ + 2 m % $Y_2O_3$ + 2 m % $Y(Nb_{0.5}Ta_{0.5})O_4$ | 1450 | 1400 | 132 | 116 | 88 | 0.005 | 1 |
| 4 | $ZrO_2$ + 2 m % $YTaO_4$ + 2 m % $Y_2O_3$ | 1450 | 1400 | 123 | 107 | 86 | 0.01 | 3 |
| 5 | $ZrO_2$ + 2 m % $YNbO_4$ + 2 m % $Y_2O_3$ + 10 wt % $Al_2O_3$ | 1450 | 1400 | 177 | 137 | 77 | 0.04 | 7 |
| 6 | $ZrO_2$ + 2 m % $NdNbO_4$ + 2.5 m % $Y_2O_3$ | 1400 | 1300 | 131 | 122 | 93 | 0.005 | 1 |
| 7 | $ZrO_2$ + 2 m % $YbGdO_3$ + 2 m % $(Yb_{0.5}Gd_{0.5})NbO_4$ | 1350 | 1300 | 94 | 80 | 84 | 0.002 | 0.5 |
| 8 | $ZrO_2$ + 2.5 m % $Y_2O_3$ + 6.5 m % $YNbO_4$ | 1550 | 1400 | 83 | 80 | 96 | 0.002 | 0.8 |
| 9 | $ZrO_2$ + 2 m % $Y_2O_3$ + 7.7 m % $YNbO_4$ | 1550 | 1400 | 97 | — | — | — | — |
| 10 | $ZrO_2$ + 11 m % $CeO_2$ | 1400 | 1300 | 85 | 83 | 99 | 0.003 | 1 |
| 11 | $ZrO_2$ + | 1600 | 1300 | 88 | 57 | 65 | 0.02 | 6 |

TABLE I-continued

| Example | Composition | S.T. | H.T. | $\sigma_f$ | $\sigma_y$ | $\sigma_y/\sigma_f$ | $\epsilon_p$ | $\epsilon_p/\epsilon_e$ |
|---|---|---|---|---|---|---|---|---|
| 12 | ZrO$_2$ + 12 m % CeO$_2$ | 1600 | 1300 | 77 | 53 | 69 | 0.014 | 5 |
| 13 | ZrO$_2$ + 13 m % CeO$_2$ | 1600 | 1300 | 89 | — | — | — | — |
| 14 | ZrO$_2$ + 14 m % CeO$_2$ | 1400 | 1300 | 45 | 30 | 66 | 0.09 | 57 |
| 15 | ZrO$_2$ + 11 m % CeO$_2$ + 0.5 m % Nb$_2$O$_5$ | 1600 | 1300 | 79 | 48 | 61 | 0.025 | 9 |
| 16 | ZrO$_2$ + 12.5 m % CeO$_2$ + 0.5 m % Nb$_2$O$_5$ | 1500 | 1300 | 84 | 77 | 92 | 0.002 | 1 |
|  | ZrO$_2$ + 1 m % YNbO$_4$ + 6 m % CeO$_2$ 1.5 m % Y$_2$O$_3$ |  |  |  |  |  |  |  |

*Subjected to a 320 grit grind; not polished.

Test bars of the composition of Example 2 were also formed from discs prepared by uniaxial hot pressing at 1500° C. and 1550° C. The hot pressed discs had a diameter of about 51 mm and a thickness of about 7-8 mm. Bars of dimensions of about 50 ×5×1 mm were sawn from those discs and polished as above. When tested in the four point beam bending technique with an inner loading span of 0.5" (≈13 mm) and an outer span of 1.25" (≈31.8 mm), the bars demonstrated average strengths of 233 Kpsi and 225 Kpsi, respectively, and both sets of bars exhibited striking transformation bands. The 1500° C. bars evidenced transformation bands under the inner loading points and the 1550° C. bars had bands extending across the entire inner span that was under tension.

A higher sintering temperature, viz., 1540° C., for the control composition (Example 1) imparts to that composition a higher toughness than sintering at 1500° C. or 1450° C. and, thus, a greater opportunity to demonstrate ductile behavior. Example 1, however, did not exhibit any non-linear strain-strain character at any sintering temperature.

In all of the above tests the humidity of the atmosphere was approximately 0.02 grams/liter or less. Hence, the pseudo-plastic deformation observed was not caused by the low temperature, water reaction mechanism described in the prior art referred to above.

Table II records alloy compositions which were subjected to a 10 Kg load in a Vickers hardness apparatus. Customarily, with high toughness ZrO$_2$ and/or HfO$_2$-containing alloys, little cracking takes place at the corners of the point indent during that test with a load at this low level. With these inventive alloys, however, a large zone of uplifted material (monoclinic ZrO$_2$/HfO$_2$ from transformed tetragonal ZrO$_2$/HfO$_2$) surrounds the point of impression. The diameter of this zone of transformation is reported in Table II in terms of microns as measured by optical microscopy. The sintering temperature (S.T.) is tabulated in terms of °C.

TABLE II

| Example | Composition | Diameter | S.T. |
|---|---|---|---|
| 1 | ZrO$_2$ + 2 m % Y$_2$O$_3$ | 200 | 1500[a] |
| 1 | " | 200 | 1540[a] |
| 2 | ZrO$_2$ + 2 m % YNbO$_4$ + 2 m % Y$_2$O$_3$ | 235-260 | 1500[a] |
| 2 | " | 230-250 | 1450[a] |
| 3 | ZrO$_2$ + 2 m % Y$_2$O$_3$ + 2 m % Y(Nb$_{0.5}$Ta$_{0.5}$)O$_4$ | 250 | 1450[b] |
| 3 | ZrO$_2$ + 2 m % Y$_2$O$_3$ + 2 m % Y(Nb$_{0.5}$Ta$_{0.5}$)O$_4$ | 210 | 1450[a] |
| 4 | ZrO$_2$ + 2 m % YTaO$_4$ + 2 m % Y$_2$O$_3$ | 290 | 1450[a] |
| 4 | " | 210-240 | 1450[a] |
| 5 | ZrO$_2$ + 2 m % YNbO$_4$ + 2 m % Y$_2$O$_3$ + 10 wt % Al$_2$O$_3$ | 190-200 | 1450[a] |
| 6 | ZrO$_2$ + 2 m % NdNbO$_4$ + 2.5 m % Y$_2$O$_3$ | 300 | 1400[b] |
| 6 | " | 200 | 1400[c] |
| 7 | ZrO$_2$ + 2 m % YbGdO$_3$ + 2 m % (Yb$_{0.5}$Gd$_{0.5}$)NbO$_4$ | 300 | 1300[b] |
| 7 | ZrO$_2$ + 2 m % YbGdO$_3$ + 2 m % (Yb$_{0.5}$Gd$_{0.5}$)NbO$_4$ | 210 | 1350[c] |
| 8 | ZrO$_2$ + 2.5 m % Y$_2$O$_3$ + 6.5 m % YNbO$_4$ | 250 | 1550[b] |
| 8 | " | 200-240 | 1550[a] |
| 9 | ZrO$_2$ + 2 m % Y$_2$O$_3$ + 7.7 m % YNbO$_4$ | 210 | 1550[b] |
| 9 | " | 225 | 1550[a] |
| 10 | ZrO$_2$ + 11 m % CeO$_2$ | 250 | 1400[c] |
| 10 | " | 575 | 1500[b] |
| 11 | ZrO$_2$ + 12 m % CeO$_2$ | 220 | 1600[c] |
| 11 | " | 400 | 1600[b] |
| 12 | ZrO$_2$ + 13 m % CeO$_2$ | 250 | 1600[c] |
| 12 | " | 300 | 1600[b] |
| 13 | ZrO$_2$ + 14 m % CeO$_2$ | 210 | 1600[c] |
| 13 | " | 240 | 1600[b] |
| 14 | ZrO$_2$ + 11 m % CeO$_2$ + 0.5 m % Nb$_2$O$_5$ | 300 | 1400[c] |
| 14 | " | 410 | 1400[b] |
| 15 | ZrO$_2$ + 12.5 m % CeO$_2$ + 0.5 m % Nb$_2$O$_5$ | 280 | 1600[c] |
| 15 | " | 340 | 1600[b] |

TABLE II-continued

| Example | Composition | Diameter | S.T. |
|---|---|---|---|
| 16 | $ZrO_2$ + 1 m % $YNbO_4$ + 6 m % $CeO_2$ + 1.5 m % $Y_2O_3$ | 240 | 1500[c] |
| 16 | $ZrO_2$ + 1 m % $YNbO_4$ + 6 m % $CeO_2$ + 1.5 m % $Y_2O_3$ | 425 | 1500[b] |
| 17 | $ZrO_2$ + 3 m % $Y_2O_3$ | 170 | 1500[d] |
| 18 | $ZrO_2$ + 1 m % $YNbO_4$ + 1.5 m % $Y_2O_3$ | 250 | 1500[d] |
| 19 | $ZrO_2$ + 2 m % $Y_2O_3$ + 1 m % $YNbO_4$ | 195 | 1430[a] |
| 20 | $ZrO_2$ + 3 m % $Y_2O_3$ + 1 m % $YNbO_4$ | 230 | 1500[d] |
| 21 | $ZrO_2$ + 3 m % $YNbO_4$ + 1.5 m % $Y_2O_3$ | 400 | 1300[a] |
| 22 | $ZrO_2$ + 2 m % $Y_2O_3$ + 4 m % $YNbO_4$ | 300 | 1500[a] |
| 23 | $ZrO_2$ + 1 m % $Y_2O_3$ + 6.5 m % $YNbO_4$ | 430 | 1500[a] |
| 24 | $ZrO_2$ + 6.8 m % $CeO_2$ + 0.6 m % $La_2O_3$ + 0.6 m % $Nd_2O_3$ | 430 | 1400[b] |
| 25 | $ZrO_2$ + 8.2 m % $CeO_2$ + 0.8 m % $La_2O_3$ + 0.8 m % $Nd_2O_3$ | 350 | 1600[b] |
| 26 | $ZrO_2$ + 1 m % $Nb_2O_5$ + 8.2 m % $CeO_2$ + 1.45 m % $La_2O_3$ + 1.45 m % $Nd_2O_3$ | 325 | 1300[b] |
| 27 | $ZrO_2$ + 1 m % $Nb_2O_5$ + 10.9 m % $CeO_2$ + 0.8 m % $La_2O_3$ + 0.8 m % $Nd_2O_3$ | 350 | 1600[b] |
| 28 | $ZrO_2$ + 1 m % $Nb_2O_5$ + 9.5 m % $CeO_2$ | 325 | 1300[b] |
| 29 | $ZrO_2$ + 1 m % $Nb_2O_5$ + 11 m % $CeO_2$ | 250 | 1600[b] |
| 30 | $ZrO_2$ + 1 m % $Nb_2O_5$ + 12.5 m % $CeO_2$ | 240 | 1600[b] |
| 31 | $ZrO_2$ + 10 m % $CeO_2$ + 1.75 m % $Nb_2O_5$ | 350 | 1300[b] |
| 32 | $ZrO_2$ + 12.5 m % $CeO_2$ + 1.75 m % $Nb_2O_5$ | 500 | 1600[b] |
| 33 | $ZrO_2$ + 12.5 m % $CeO_2$ + 2.5 m % $Nb_2O_5$ | 350 | 1600[b] |
| 34 | $ZrO_2$ + 2.5 m % $Nb_2O_5$ + 11.75 m % $CeO_2$ | 310 | 1300[b] |
| 35 | $ZrO_2$ + 2.5 m % $Nb_2O_5$ + 13.25 m % $CeO_2$ | 290 | 1400[b] |
| 36 | $ZrO_2$ + 2.5 m % $Nb_2O_5$ + 14.75 m % $CeO_2$ | 250 | 1600[b] |
| 37 | $ZrO_2$ + 14 m % $CeO_2$ + 3.75 m % $Nb_2O_5$ | 340 | 1300[b] |
| 38 | $ZrO_2$ + 2 m % $Y_2O_3$ + 2.5 m % $CaWO_4$ | 255 | 1500[b] |
| 39 | $ZrO_2$ + 2 m % $Y_2O_3$ + 5 m % $CaWO_4$ | 260 | 1500[b] |
| 40 | $ZrO_2$ + 2 m % $Y_2O_3$ + 10 m % $CaWO_4$ | 250 | 1500[b] |
| 41 | $ZrO_2$ + 0.75 m % $Y_2O_3$ + 7.7 m % $YNbO_4$ | 285 | 1400[b] |
| 42 | $ZrO_2$ + 0.24 m % $Y_2O_3$ + 8.7 m % $YNbO_4$ | 435 | 1300[c] |
| 43 | $ZrO_2$ + 4 m % $Y_2O_3$ | 150 | 1500[b] |
| 44 | $ZrO_2$ + 25 m % $TiO_2$ + 1 m % $Y_2O_3$ | 175 | 1400[b] |
| 45 | $ZrO_2$ + 35 m % $TiO_2$ + 4 m % $CeO_2$ | 150 | 1400[b] |
| 46 | $ZrO_2$ + 35 m % $TiO_2$ + 1 m % $Nd_2O_3$ | 175 | 1300[b] |
| 47 | $ZrO_2$ + 35 m % $TiO_2$ + 1 m % $GdYbO_3$ | 140 | 1500[b] |
| 48 | $ZrO_2$ + 4.9 m % $Y_2O_3$ + 2.7 m % $YNbO_4$ | 140 | 1500[d] |
| 49 | $ZrO_2$ + 4.7 m % $Y_2O_3$ + 5.5 m % $YNbO_4$ | 125-175 | 1500[d] |
| 50 | $ZrO_2$ + 4.6 m % $Y_2O_3$ + 8.4 m % $YNbO_4$ | 125 | 1600[d] |
| 51 | $ZrO_2$ + 4 m % $Y_2O_3$ + 2.5 m % $CaWO_4$ | 125 | 1600[d] |
| 52 | $ZrO_2$ + 6 m % $Y_2O_3$ + 2.5 m % $CaWO_4$ | 155 | 1500[d] |
| 53 | $ZrO_2$ + 2.6 m % $Y_2O_3$ + 14.6 m % $YNbO_4$ | 150 | 1600[d] |

[a]subsequently hot isostatically pressed at 1400° C., C heating elements
[b]sintered in air
[c]subsequently hot isostatically pressed at 1300° C., Mo heating elements
[d]sintered in vacuum A comparison of Tables I and II indicates that, in order to manifest ductile behavior at room temperature, a $ZrO_2$ and/or $HfO_2$-based alloy ought to demonstrate a fracture strength of at least 150 Kpsi and/or exhibit a transformation zone diameter greater than about 200 microns in the Vickers hardness indentation test described above. Nevertheless, it has been observed that, as the size of the transformation zone increases, the yield stress decreases. This phenomenon means that compositions displaying very large transformation zone areas are capable of manifesting ductile character at fracture strengths less than 150 Kpsi.

Examples 1, 17, and 43-53 exhibit essentially no pseudo-plasticity and illustrate the criticality of composition control to achieve that phenomenon. Examples 1, 17, and 43-47 contain no toughening agent and display transformation zone sizes of 175 microns or less, except Example 1 which demonstrates a transformation zone of about 200 microns. Examples 44-47 contain high concentrations of $TiO_2$. Examples 48, 49, 51, and 52 exhibit transformation zones of 180 microns and less even though they contain toughening agents; however, the level of $Y_2O_3$ is too high. Example 50 has a very small transformation zone which is believed to be the result of excess toughening agent and $Y_2O_3$. Finally, although Example 53 has a proper amount of $Y_2O_3$, it displays a small transformation zone which is believed to be due to an excessive amount of toughening agent.

Table II also illustrates that samples which were hot isostatically pressed commonly exhibited smaller transformation zones than when merely sintered in air. This particularly appears to be the case with the $CeO_2$-containing samples. The hot isostatic pressing does, however, significantly reduce the residual porosity of the fired bodies, which reduction can lead to increased strength.

In like manner to the tests reported in Table I, the humidity of the atmosphere was no more than 0.02 grams/liter.

The compositions of this invention demonstrating pseudo-plasticity do not manifest significant cracking from the corners of the indent impression in the 10 Kg indentation test. In sharp contrast, Examples 17 and 43-53 displayed large cracks in that test. Utilizing the length of those cracks, it is possible to calculate the toughness of those compositions following the equation given in U.S. Pat. No. 4,753,902, supra, viz.:

$K_{IC} = 0.016(E^{\frac{1}{2}} P^{\frac{1}{2}} {}_{d}C - 1.5)$ wherein

E=200 GPa; P=load of 10 Kg; d=indent diagonal; and C=crack length from center of indent impression.

Table III records the toughness values of Examples 17 and 43-53 in terms of MPam½.

TABLE III

| Example | $K_{IC}$ |
| --- | --- |
| 17 | 4.9 |
| 43 | 4.5 |
| 44 | 5.8 |
| 45 | 3.5 |
| 46 | 4.6 |
| 47 | 5.1 |
| 48 | 4.3 |
| 49 | 4.3 |
| 50 | 3.7 |
| 51 | 4.6 |
| 52 | 3.3 |
| 53 | 2.6 |

Each of the inventive materials exhibiting pseudo-plasticity would demonstrate toughness values greater than 12 MPam½ in this test.

The following three experiments were conducted to illustrate the shape memory behavior of the inventive alloys:

EXPERIMENT I

A strip of Example 2 having the dimensions of 32×4×0.3 mm was bent by the action of a diamond saw at ambient temperature producing a continuous zone of transformation on the sawn side of the strip. When this curved strip was heated to about 700° C. in an electrically-heated furnace with no stress applied thereto, it became straight and remained straight upon cooling to room temperature.

Although not wishing to be bound by any theory, I believe the bending phenomenon can be explained as follows. When a ceramic article is cut with a diamond saw or ground with an abrasive grinding material, small sharp points of the diamonds in the saw or grinding medium scrape along the surface of the article. Those sharp points produce very high local compressive and tensile stresses. In typical ceramics those stresses are sufficiently high to induce cracking on a very small scale and numerous cracks link up and small particles of the ceramic are removed. Laboratory examinations have shown that during diamond sawing and during grinding very high local stresses occur that cause extensive transformation on the surface being sawn or ground, although the material removal mechanism described above may be modified somewhat by the high toughness resulting from the transformation toughening in the materials of this invention. It is posited that this extensive transformation on the sawn side of the strip led to the bending observed.

EXPERIMENT II

A bar of Example 14 having the dimensions of 26×5×1 mm was bent via the four point bending technique at ambient temperature. When heated to about 170° C. with no applied external stress, the bar became straight. Visual observation showed that, as the temperature approached 170° C., the transformation bands decreased in number and size. Upon cooling to room temperature, the bar remained straight.

The bar was thereafter bent manually at ambient temperature over the edge of a laboratory bench. The formation of transformation bands on the tensile side of the bar could again be visually observed. The heating cycle was repeated and the bar once again became straight without any external stress being applied thereto.

EXPERIMENT III

A bar of Example 15 having the dimensions of 55×8×2 mm was bent after being sawn from a larger billet. The bar had a sawn surface and an "as hot isostatically pressed" surface. Surprisingly, the "as hot isostatically pressed" surface was convex while the sawn surface was concave. When the bar was heated to about 220° C., the bar straightened out with no application of external stress. Upon cooling to room temperature, however, the bar returned to its previous curvature.

I am not certain as to the mechanism underlying that bending phenomenon, but I have postulated the following explanation. I believe that the exterior side of the billet had a grain size or composition slightly different from that of the interior, which resulted in more monoclinic $ZrO_2$ alloy being present on the exterior of the billet. That circumstance leads to a bent bar with the sawn surface thereof being concave. Hence, more of the exterior grains transform to the monoclinic phase when cooling from the sintering temperature than do the interior grains, and that situation remains true after heating to 220° C. and then cooling again to room temperature; which, in turn, results in the bend returning when the bar is cooled tn room temperature.

This type of two-way shape memory element can be more easily controlled by deliberately fashioning an article wherein selected areas have composition or grain size differences that produce different concentrations of monoclinic $ZrO_2$ alloy in the different areas of the article. An example of this would be a strip of material where tape cast layers of different compositions are laminated together and the laminate is then sintered. The sintering temperature and the compositions are adjusted so that one side of the strip has a significant level of monoclinic $ZrO_2$ alloy, while the other side of the strip has a much lower level. The strip will then bend as it is cooled and the monoclinic phase forms. When heated, the strip will straighten, but when cooled again to room temperature, the bend in the strip will return. As demonstrated in the three examples above, the temperature where the strip will straighten could be varied from about 170°-700° C. I believe that with such a strip the temperature of bending and straightening could be varied from almost 0° K. to over 1200°-1300° C., depending upon the compositions and grain sizes of the two materials that would make up the strip.

In view of the various samples examined, it appears that in those compositions demonstrating ductility the average stress/strain required to initiate the tetragonal-to-monoclinic transformation is lower than the fracture strength/strain of the alloy. Large, strength limiting voids and cracks should be avoided. Nevertheless, small diameter, well-distributed porosity and second phases that form elastic or thermal expansion inhomogeneities may be beneficial by forming local areas of high stress/strain that can nucleate or re-initiate the transformation bands. Excessive levels of a second phase ought to be avoided, however, inasmuch as the second phase may inhibit the auto-catalytic action of the tetragonal to monoclinic phase transformation in generating the transformation bands.

The addition of such toughening agents as yttrium niobate, a rare earth vanadate, calcium tungstate, and $SnO_2$ appears to alter the anisotropic coefficients of thermal expansion and lattice parameters of both the tetragonal and monoclinic phases, and to alter the thermodynamic driving force for the phase transformation. Laboratory experience indicates that the addition of toughening agents leads to larger zones of transformation around indent impressions and transformation bands in bend bars. It is postulated that this phenomenon manifests itself as a yield/transformation stress that is lower than the fracture strength, thereby resulting in ductile behavior.

Table IV records compositions which were subjected to bending tests conducted at or below room temperature. Stress-strain data were not obtained because of experimental difficulties encountered due to the cold temperatures. However, all of the examples listed in Table IV displayed transformation bands after testing, and even after being returned to room temperature.

The test bars were formed in like manner to those reported in Table I and had similar dimensions. All of the bars were sintered in air at 1430° C., followed by isostatic pressing at 1400° C. in an atmosphere of argon for two hours at 20 Kpsi using carbon heating elements, with the exception of Example 18 which was sintered in air at 1300° C., followed by isostatic pressing at 1300° C. in an argon atmosphere for two hours at 20 Kpsi using molybdenum heating elements.

The bars were tested in four point bending with an outer span of two inches ($\approx 51$ mm) and an inner span of 0.75 inch ($\approx 19$ mm). The crosshead speed was 0.2 mm/minute. The testing fixture was enclosed in an environmental chamber capable of being cooled below $-70°$ C. using liquid nitrogen as a coolant, and capable of being heated above 200° C. The recorded fracture strengths were calculated using the dimensions of the bars, the load at fracture, and the standard beam bending formula. Each composition displayed transformation bands after testing.

TABLE IV

| Example | Testing Temperature (°C.) | Fracture Strength (Kpsi) |
| --- | --- | --- |
| 18 | −70° | 127 |
| 19 | −70° | 137 |
| 20 | −70° | 115 |
| 20 | −50° | 120 |
| 19 | −25° | 120 |
| 20 | −25° | 152 |
| 22 | −25° | 97 |
| 19 | Room Temp. | 162 |

Bars of Example 2, which had been sintered in air at 1450° C. and then isostatically pressed at 1400° C. for two hours at 20 Kpsi, were then ground with a 320 grit SiC grinding wheel, but not polished. When tested at −50° C. and −70° C., such bars exhibited transformation bands and a permanent deformation (bend).

It is believed apparent from the above results that the mechanism for deformation is not the water vapor corrosion mechanism found in the prior art discussed above.

Bars of Example 2 were sintered in air at two different temperatures, viz., 1450° C. and 1500° C., thereby producing different grain sizes, followed by isostatic pressing at 1400° C. for two hours at 20 Kpsi. The fabrication and polishing of the bars, their dimensions, and the dimensions of the testing fixture were as described above. The bars were tested in four point beam bending at a constant load of 400 MPa for 15 minutes at 200° C. The bars were loaded to 400 MPa in less than about two minutes. Plastic strain was measured at room temperature after deformation utilizing the method described by Hollenberg, Terwilliger, and Gordon in the *Journal of the American Ceramic Society*, 54, No. 4, pages 196-199. The plastic strain achieved by the bar sintered at 1450° C. was between about 0.02–0.03% after exposure for 15 minutes at 200° C. stress of 400 MPa. In contrast, the strain observed in the bar sintered at 1500° C. was about 0.52% after being subjected for 15 minutes to a constant stress of 400 MPa at 200° C.

These data demonstrate that through control of sintering temperature, with resultant control of grain size, as well as through control of composition, deformation rates under constant load at 200° C. can be changed by over an order of magnitude. Hence, the deformation rate achieved by the bar sintered at 1500° C. exhibited a rate of deformation an order of magnitude greater than the ceramics disclosed in U.S. Pat. No. 4,767,730, supra.

I claim:

1. A ceramic alloy exhibiting pseudo-plasticity through the presence of transformation bands and with the substantial absence of microcracking consisting essentially, expressed in terms of mole percent on the oxide basis, of
   (A) 82–99% of at least one member selected from the group consisting of $ZrO_2$, $HfO_2$, and $ZrO_2$-$HfO_2$ solid solution;
   (B) 0.5–10% of at least one stabilizer oxide in the indicated proportions selected from the group consisting of 0–3.5% $Y_2O_3$, 0–3.5% $Sc_2O_3$, 0–3.5% $RE_2O_3$, 0–10% $CeO_2$, 0–10% $TiO_2$, 0–10% $SnO_2$, 0–10% CaO, and 0–10% MgO; and
   (C) 0.5–8% of a toughening agent in the indicated proportion selected from the group consisting of 0–8% $YNbO_4$, 0–8% $YTaO_4$, 0–8% $YVO_4$, 0–8% $RENbO_4$, 0–8% $RETaO_4$, 0–8% $REVO_4$, 0–8% $MgWO_4$, 0–8% $MgMoO_4$, 0–8% $CaWO_4$, 0–8% $CaMoO_4$, and 0–8% $SnO_2$.

2. A ceramic alloy according to claim 1 wherein said toughening agent is present in an amount up to 5% and $Y_2O_3$ and/or $Sc_2O_3$ and/or $RE_2O_3$ in an amount up to 2.5% constitutes the stabilizer oxide.

3. A composite article exhibiting pseudo-plasticity with the substantial absence of microcracking consisting essentially of at least 50% by volume of a ceramic alloy consisting essentially, expressed in terms of mole percent on the oxide basis, of
   (A) 82–99% of at least one member selected from the group consisting of $ZrO_2$, $HfO_2$, and $ZrO_2$-$HfO_2$ solid solution;
   (B) 0.5–10% of at least one stabilizer oxide in the indicated proportions selected from the group consisting of 0–3.5% $Y_2O_3$, 0–3.5% $Sc_2O_3$, 0–3.5% $RE_2O_3$, 0–10% $CeO_2$, 0–10% $TiO_2$, 0–10% $SnO_2$, 0–10% CaO, and 0–10% MgO; and
   (C) 0.5–8% of a toughening agent in the indicated proportion selected from the group consisting of 0–8% $YNbO_4$, 0–8% $YTaO_4$, 0–8% $YVO_4$, 0–8% $RENbO_4$, 0–8% $RETaO_4$, 0–8% $REVO_4$, 0–8% $MgWO_4$, 0–8% $MgMoO_4$, 0–8% $CaWO_4$, 0–8% $CaMoO_4$, and 0–8% $SnO_2$;
with the remainder being a hard refractory ceramic.

4. A composite article according to claim 3 wherein said hard refractory ceramic is selected from the group consisting of $Al_2O_3$, $Al_2O_3$-$Cr_2O_3$ solid solution, $Cr_2O_3$, mullite, silicon carbide, silicon nitride, spinel, titanium carbide, titanium diboride, titanium nitride, zircon, and zirconium carbide.

5. A composite article exhibiting pseudo-plasticity with the substantial absence of microcracking consisting essentially of at least 70% by volume of a ceramic alloy consisting essentially, expressed in terms of mole percent on the oxide basis, of
  (A) 82-99% of at least one member selected from the group consisting of $ZrO_2$, $HfO_2$, and $ZrO_2$-$HfO_2$ solid solution;
  (B) 0.5-10% of at least one stabilizer oxide in the indicated proportions selected from the group consisting of 0-3.5% $Y_2O_3$, 0-3.5% $Sc_2O_3$, 0-3.5% $RE_2O_3$, 0-10% $CeO_2$, 0-10% $TiO_2$, 0-10% $SnO_2$, 0-10% CaO, and 0-10% MgO; and
  (C) 0.5-8% of a toughening agent in the indicated proportion selected from the group consisting of 0-8% $YNbO_4$, 0-8% $YTaO_4$, 0-8% $YVO_4$, 0-8% $RENbO_4$, 0-8% $RETaO_4$, 0-8% $REVO_4$, 0-8% $MgWO_4$, 0-8% $MgMoO_4$, 0-8% $CaWO_4$, 0-8% $CaMoO_4$, and 0-8% $SnO_2$;
with the remainder being refractory ceramic fibers and/or whiskers.

6. A composite article according to claim 5 wherein said refractory ceramic fibers and/or whiskers are selected from the group consisting of $Al_2O_3$, mullite, sialon, SiC, $Si_3N_4$, AlN, $B_4C$, BN, $ZrO_2$, zircon, silicon oxycarbide, and spinel.

7. A composite article exhibiting pseudo-plasticity with the substantial absence of microcracking consisting of a hard refractory ceramic, refractory ceramic fibers and/or whiskers, and at least 50% by volume of a ceramic alloy consisting essentially, expressed in terms of mole percent on the oxide basis, of
  (A) 82-99% of at least one member selected from the group consisting of $ZrO_2$, $HfO_2$, and $ZrO_2$-$HfO_2$ solid solution;
  (B) 0.5-10% of at least one stabilizer oxide in the indicated proportions selected from the group consisting of 0-3.5% $Y_2O_3$, 0-3.5% $Sc_2O_3$, 0-3.5% $RE_2O_3$, 0-10% $CeO_2$, 0-10% $TiO_2$, 0-10% $SnO_2$, 0-10% CaO, and 0-10% MgO; and
  (C) 0.5-8% of a toughening agent in the indicated proportion selected from the group consisting of 0-8% $YNbO_4$, 0-8% $YTaO_4$, 0-8% $YVO_4$, 0-8% $RENbO_4$, 0-8% $RETaO_4$, 0-8% $REVO_4$, 0-8% $MgWO_4$, 0-8% $MgMoO_4$, 0-8% $CaWO_4$, 0-8% $CaMoO_4$, and 0-8% $SnO_2$;
said refractory ceramic fibers and/or whiskers being present in an amount of at least 5%, but less than 30%, by volume, and said hard refractory ceramic comprising the remainder of said article.

8. A composite article according to claim 7 wherein said refractory ceramic fibers and/or whiskers were selected from the group consisting of $Al_2O_3$, mullite, sialon, SiC, $Si_3O_4$, AlN, $B_4C$, BN, $ZrO_2$, zircon, silicon oxycarbide, and spinel, and said hard refractory ceramic is selected from the group consisting of $Al_2O_3$, $Al_2O_3$-$Cr_2O_3$ solid solution, $Cr_2O_3$, mullite, silicon carbide, silicon nitride, spinel, titanium carbide, titanium diboride, titanium nitride, zircon, and zirconium carbide.

9. A composite article exhibiting pseudo-plasticity with the substantial absence of microcracking consisting essentially of at least 50% by volume of a ceramic alloy consisting essentially, expressed in terms of mole percent on the oxide basis, of
  (A) 82-99% of at least one member selected from the group consisting of $ZrO_2$, $HfO_2$, and $ZrO_2$-$HfO_2$ solid solution;
  (B) 0.5-10% of at least one stabilizer oxide in the indicated proportions selected from the group consisting of 0-3.5% $Y_2O_3$, 0-3.5% $Sc_2O_3$, 0-3.5% $RE_2O_3$, 0-10% $CeO_2$, 0-10% $TiO_2$, 0-10% $SnO_2$, 0-10% CaO, and 0-10% MgO; and
  (C) 0.5-8% of a toughening agent in the indicated proportion selected from the group consisting of 0-8% $YNbO_4$, 0-8% $TYaO_4$, 0-8% $YVO_4$, 0-8% $RENbO_4$, 0-8% $RETaO_4$, 0-8% $REVO_4$, 0-8% $MgWO_4$, 0-8% $MgMoO_4$, 0-8% $CaWO_4$, 0-8% $CaMoO_4$, and 0-8% $SnO_2$;
with the remainder being a refractory glass, said glass having a composition free of components acting to leach out the elements of the stabilizers and toughening agents from said alloy and containing substantial amounts of stabilizers and toughening agents to thereby approach chemical equilibrium between said alloy and the glass composition.

10. A composite article according to claim 9 wherein said refractory glass is selected from the group consisting of $Sc_2O_3$, $Y_2O_3$ and/or rare earth metal oxide aluminosilicate glasses.

11. A composite article exhibiting pseudo-plasticity with the substantial absence of microcracking consisting essentially of a ceramic alloy consisting essentially, expressed in terms of mole percent on the oxide basis, of
  (A) 82-99% of at least one member selected from the group consisting of $ZrO_2$, $HfO_2$, and $ZrO_2$-$HfO_2$ solid solution;
  (B) 0.5-10% of at least one stabilizer oxide in the indicated proportions selected from the group consisting of 0-3.5% $Y_2O_3$, 0-3.5% $Sc_2O_3$, 0-3.5% $RE_2O_3$, 0-10% $CeO_2$, 0-10% $TiO_2$, 0-10% $SnO_2$, 0-10% CaO, and 0-10% MgO; and
  (C) 0.5-8% of a toughening agent in the indicated proportion selected from the group consisting of 0-8% $YNbO_4$, 0-8% $YTaO_4$, 0-8% $YVO_4$, 0-8% $RENbO_4$, 0-8% $RETaO_4$, 0-8% $REVO_4$, 0-8% $MgWO_4$, 0-8% $MgMoO_4$, 0-8% $CaWO_4$, 0-8% $CaMoO_4$, and 0-8% $SnO_2$;
and having high strength materials in a form selected from the group consisting of rods, sheets, and fibers entrained therewithin.

12. A composite article according to claim 11 wherein said high strength materials are selected from the group consisting of a non-ductile $ZrO_2$ alloy and a non-ductile $ZrO_2$ alloy with $Al_2O_3$.

13. A ceramic alloy exhibiting pseudo-plasticity through the presence of transformation bands and with the substantial absence of microcracking consisting essentially, expressed in terms of mole percent on the oxide basis, of
  (A) 79-91.75% of at least one member selected from the group consisting of $ZrO_2$, $HfO_2$, and $ZrO_2$-$HfO_2$ solid solution;
  (B) 8-16% $CeO_2$; and
  (C) 0.25-5% $Nb_2O_5$ and/or $Ta_2O_5$ and/or $V_2O_5$.

14. A ceramic alloy according to claim 13 wherein up to one-half of said $CeO_2$ is replaced by $Y_2O_3$ and/or $RE_2O_3$.

15. A ceramic alloy according to claim 13 containing 8-14% $CeO_2$ and 0.25-2.5% $Nb_2O_5$ and/or $Ta_2O_5$ and/or $V_2O_5$.

16. A ceramic alloy according to claim 15 wherein up to one-half of said $CeO_2$ is replaced by $Y_2O_3$ and/or $RE_2O_3$.

17. A composite article exhibiting pseudo-plasticity with the substantial absence of microcracking consisting essentially of at least 50% by volume of a ceramic alloy consisting essentially, expressed in terms of mole percent on the oxide basis, of
  (A) 79–91.75% of at least one member selected from the group consisting of $ZrO_2$, $HfO_2$, and $ZrO_2$-$HfO_2$ solid solution;
  (B) 8–16% $CeO_2$; and
  (C) 0.25–5% $Nb_2O_5$ and/or $Ta_2O_5$ and/or $V_2O_5$;
with the remainder being a hard refractory ceramic.

18. A composite article according to claim 17 wherein said hard refractory ceramic is selected from the group consisting of $Al_2O_3$, $Al_2O_3$-$Cr_2O_3$ solid solution, $Cr_2O_3$, mullite, silicon carbide, silicon nitride, spinel, titanium carbide, titanium diboride, titanium nitride, zircon, and zirconium carbide.

19. A composite article exhibiting pseudo-plasticity with the substantial absence of microcracking consisting essentially of at least 70% by volume of a ceramic alloy consisting essentially, expressed in terms of mole percent on the oxide basis, of
  (A) 79–91.75% of at least one member selected from the group consisting of $ZrO_2$, $HfO_2$, and $ZrO_2$-$HfO_2$ solid solution;
  (B) 8–16% $CeO_2$; and
  (C) 0.25–5% $Nb_2O_5$ and/or $Ta_2O_5$ and/or $V_2O_5$;
with the remainder being refractory ceramic fibers and/or whiskers.

20. A composite article according to claim 19 wherein said refractory ceramic fibers and/or whiskers are selected from the group consisting of $Al_2O_3$, mullite, sialon, SiC, $Si_3N_4$, AlN, $B_4C$, BN, $ZrO_2$, zircon, silicon oxycarbide, and spinel.

21. A composite article exhibiting pseudo-plasticity with the substantial absence of microcracking consisting of a hard refractory ceramic, refractory ceramic fibers and/or whiskers, and at least 50% by volume of a ceramic alloy consisting essentially, expressed in terms of mole percent on the oxide basis, of
  (A) 79–91.75% of at least one member selected from the group consisting of $ZrO_2$, $HfO_2$, and $ZrO_2$-$HfO_2$ solid solution;
  (B) 8–16% $CeO_2$; and
  (C) 0.25–5% $Nb_2O_5$ and/or $Ta_2O_5$ and/or $V_2O_5$;
said refractory ceramic fibers and/or whiskers being present in an amount of at least 5%, but less than 30%, by volume, and said hard refractory ceramic comprising the remainder of said article.

22. A composite article exhibiting pseudo-plasticity with the substantial absence of microcracking consisting essentially of at least 50% by volume of a ceramic alloy consisting essentially, expressed in terms of mole percent on the oxide basis, of
  (A) 79–91.75% of at least one member selected from the group consisting of $ZrO_2$, $HfO_2$, and $ZrO_2$-$HfO_2$ solid solution;
  (B) 8–16% $CeO_2$; and
  (C) 0.25–5% $Nb_2O_5$ and/or $Ta_2O_5$ and/or $V_2O_5$;
with the remainder being a refractory glass, said glass having a composition free of components acting to leach out the elements of the stabilizers and toughening agents from said alloy and containing substantial amounts of stabilizers and toughening agents to thereby approach chemical equilibrium between said alloy and the glass composition.

23. A composite article according to claim 22 wherein said refractory glass is selected from the group consisting of $Sc_2O_3$, $Y_2O_3$ and/or rare earth metal oxide aluminosilicate glasses.

24. A composite article exhibiting pseudo-plasticity with the substantial absence of microcracking consisting essentially of a ceramic alloy consisting essentially, expressed in terms of mole percent on the oxide basis, of
  (A) 79–91.75% of at least one member selected from the group consisting of $ZrO_2$, $HfO_2$, and $ZrO_2$-$HfO_2$ solid solution;
  (B) 8–16% $CeO_2$; and
  (C) 0.25–5% $Nb_2O_5$ and/or $Ta_2O_5$ and/or $V_2O_5$;
having high strength materials in a form selected from the group consisting of rods, sheets, and fibers entrained therewithin.

25. A composite article according to claim 24 wherein said high strength materials are selected from the group consisting of a non-ductile $ZrO_2$ alloy and a non-ductile $ZrO_2$ alloy with $Al_2O_3$.

26. A composite article exhibiting pseudo-plasticity with the substantial absence of microcracking consisting essentially of at least 50% by volume of a ceramic alloy consisting essentially, expressed in terms of mole percent on the oxide basis, of
  (A) 79–91.75% of at least one member selected from the group consisting of $ZrO_2$, $HfO_2$, and $ZrO_2$-$HfO_2$ solid solution;
  (B) 8–16% $CeO_2$; and
  (C) 0.25–5% $Nb_2O_5$ and/or $Ta_2O_5$ and/or $V_2O_5$; and
  (D) wherein up to one half of said $CeO_2$ is replaced by $Y_2O_3$ and/or $RE_2O_3$
with the remainder being a hard refractory ceramic.

27. A composite article according to claim 26 wherein said hard refractory ceramic is selected from the group consisting of $Al_2O_3$, $Al_2O_3$-$Cr_2O_3$ solid solution, $Cr_2O_3$, mullite, silicon carbide, silicon nitride, spinel, titanium carbide, titanium diboride, titanium nitride, zircon, and zirconium carbide.

28. A composite article exhibiting pseudo-plasticity with the substantial absence of microcracking consisting essentially of at least 70% by volume of a ceramic alloy consisting essentially, expressed in terms of mole percent on the oxide basis, of
  (A) 79–91.75% of at least one member selected from the group consisting of $ZrO_2$, $HfO_2$, and $ZrO_2$-$HfO_2$ solid solution;
  (B) 8–16% $CeO_2$; and
  (C) 0.25–5% $Nb_2O_5$ and/or $Ta_2O_5$ and/or $V_2O_5$; and
  (D) wherein up to one half of said $CeO_2$ is replaced by $Y_2O_3$ and/or $RE_2O_3$
with the remainder being refractory ceramic fibers and/or whiskers.

29. A composite article according to claim 28 wherein said refractory ceramic fibers and/or whiskers are selected from the group consisting of $Al_2O_3$, mullite, sialon, SiC, $Si_3N_4$, AlN, $B_4C$, BN, $ZrO_2$, zircon, silicon oxycarbide, and spinel.

30. A composite article exhibiting pseudo-plasticity with the substantial absence of microcracking consisting of a hard refractory ceramic, refractory ceramic fibers and/or whiskers, and at least 50% by volume of a ceramic alloy consisting essentially, expressed in terms of mole percent on the oxide basis, of (A) 79-91.75% of at least one member selected from the group consisting of $ZrO_2$, $HfO_2$, and $ZrO_2$-$HfO_2$ solid solution;

(B) 8-16% $CeO_2$; and (C) 0.25-5% $Nb_2O_5$ and/or $Ta_2O_5$ and/or $V_2O_5$; and (D) wherein up to one half of said $CeO_2$ is replaced by $Y_2O_3$ and/or $RE_2O_3$ said refractory ceramic fibers and/or whiskers being present in an amount of at least 5%, but less than 30%, by volume, and said hard refractory ceramic comprising the remainder of said article.

31. A composite article according to claim 30 wherein said refractory ceramic fibers and/or whiskers were selected from the group consisting of $Al_2O_3$, mullite, sialon, SiC, $Si_3O_4$, AlN, $B_4C$, BN, $ZrO_2$, zircon, silicon oxycarbide, and spinel, and said hard refractory ceramic is selected from the group consisting of $Al_2O_3$, $Al_2O_3$-$Cr_2O_3$ solid solution, $Cr_2O_3$, mullite, silicon carbide, silicon nitride, spinel, titanium carbide, titanium diboride, titanium nitride, zircon, and zirconium carbide.

32. A composite article exhibiting pseudo-plasticity with the substantial absence of microcracking consisting essentially of at least 50% by volume of a ceramic alloy consisting essentially, expressed in terms of mole percent on the oxide basis, of (A) 79-91.75% of at least one member selected from the group consisting of $ZrO_2$, $HfO_2$, and $ZrO_2$-$HfO_2$ solid solution;

(B) 8-16% $CeO_2$; and (C) 0.25-5% $Nb_2O_5$ and/or $Ta_2O_5$ and/or $V_2O_5$; and (D) wherein up to one half of said $CeO_2$ is replaced by $Y_2O_3$ and/or $RE_2O_3$ with the remainder being a refractory glass, said glass having a composition free of components acting to leach out the elements of the stabilizers and toughening agents from said alloy and containing substantial amounts of stabilizers and toughening agents to thereby approach chemical equilibrium between said alloy and the glass composition.

33. A composite article according to claim 31 wherein said refractory glass is selected from the group consisting of $Sc_2O_3$, $Y_2O_3$ and/or rare earth metal oxide aluminosilicate glasses.

34. A composite article exhibiting pseudo-plasticity with the substantial absence of microcracking consisting essentially of a ceramic alloy consisting essentially, expressed in terms of mole percent on the oxide basis, of (A) 79-91.75% of at least one member selected from the group consisting of $ZrO_2$, $HfO_2$, and $ZrO_2$-$HfO_2$ solid solution;

(B) 8-16% $CeO_2$; and (C) 0.25-5% $Nb_2O_5$ and/or $Ta_2O_5$ and/or $V_2O_5$; and (D) wherein up to one half of said $CeO_2$ is replaced by $Y_2O_3$ and/or $RE_2O_3$ having high strength materials in a form selected from the group consisting of rods, sheets, and fibers entrained therewithin.

35. A composite article according to claim 34 wherein said high strength materials are selected from the group consisting of a non-ductile $ZrO_2$ alloy and a non-ductile $ZrO_2$ alloy with $Al_2O_3$.

* * * * *

UNITED STATES PATENT AND TRADEMARK OFFICE
CERTIFICATE OF CORRECTION

PATENT NO.    : 5,047,373
DATED         : Sept. 10, 1991
INVENTOR(S)   : Thomas D. Ketcham It is certified that error appears in the above-identified patent and that said Letters Patent is hereby corrected as shown below:

On the title page:

In the Abstract, line 10, "0-8&" should read --0-8%--.

In the Abstract, line 12, "indicates" should read --indicated--.

In column 10, Table I, Example 2, Composition should read --$ZrO_2$ + 2m% $YNbO_4$ + 2m% $Y_2O_3$--.

In column 10, Table I, Example 2*, Composition should read --$ZrO_2$ + 2M% $YNbO_4$ + 2m% $Y_2O_3$--.

In column 11, Table I-continued, Example 16, third line should read --6m% $CeO_2$ +--.

In column 12, Table II, Example 3, Diameter 290, S.T. should read --$1450^b$--.

UNITED STATES PATENT AND TRADEMARK OFFICE
CERTIFICATE OF CORRECTION

PATENT NO. : 5,047,373
DATED : Sept. 10, 1991
INVENTOR(S) : Thomas D. Ketcham

It is certified that error appears in the above-identified patent and that said Letters Patent is hereby corrected as shown below:

In column 16, line 29, "tn" should read --to--.

In column 18, line 7, after "200°C." insert --under a constant--.

In column 20, line 11, "TYaO$_4$" should read --YTaO$_4$--.

Signed and Sealed this

Fifth Day of January, 1993

*Attest:*

DOUGLAS B. COMER

*Attesting Officer*   Acting Commissioner of Patents and Trademarks